Oct. 24, 1939.  C. SMITH  2,176,934
CALCULATING MACHINE
Original Filed May 31, 1932   5 Sheets-Sheet 1

INVENTOR.
Clyde Smith
BY Wm. O. Belt
ATTORNEY

Oct. 24, 1939.　　　C. SMITH　　　2,176,934
CALCULATING MACHINE
Original Filed May 31, 1932　　5 Sheets-Sheet 2

INVENTOR.
Clyde Smith
BY Wm. O. Belt
ATTORNEY

Oct. 24, 1939.                C. SMITH                2,176,934
                         CALCULATING MACHINE
               Original Filed May 31, 1932    5 Sheets-Sheet 5

INVENTOR.
Clyde Smith
BY Wm O Bell
                                        ATTORNEY Patented Oct. 24, 1939

2,176,934

UNITED STATES PATENT OFFICE 2,176,934

CALCULATING MACHINE

Clyde Smith, Hopkinsville, Ky., assignor to Addressograph-Multigraph Corporation, Cleveland, Ohio, a corporation of Delaware Original application May 31, 1932, Serial No. 614,411. Divided and this application June 11, 1936, Serial No. 84,693

17 Claims. (Cl. 235—133)

This application is a division of my application Serial No. 614,411, filed May 31, 1932.

The invention relates to calculating machines and the primary object is to provide a novel electrical accumulative carry-over for effecting a carry from one order of digits to the next order when required.

Other important objects are to accumulate a carry during a computation; to effect a carry-over from one order of digits to the next order as the last step of a computation; and to effect a carry-over from one order to the next order progressively as required from the lowest to the highest orders in adding and multiplying computations.

Still further objects of my invention are to accumulate a carry and to effect a carry-over electrically; to effect accumulation of the carry under control of the manifesting device in which the result of a computation is entered; to effect the entry of the carry in the manifesting device under control of such device; to prevent entry of the carry until the other steps in the computation are completed; to accumulate for one order of digits the carry required from the adjacent order of digits; and to provide an accumulative carry-over of simple and economical construction and efficient and positive operation.

A selected embodiment of my invention is illustrated in the accompanying drawings wherein Fig. 1 is a diagrammatic perspective view of the adding and multiplicand keys;

DESCRIPTION OF THE APPARATUS

The function of the various elements and circuits in which they are included are first described. Subsequently the operation of these elements and circuits is described in connection with the performance of illustrative computations.

Figure 1:
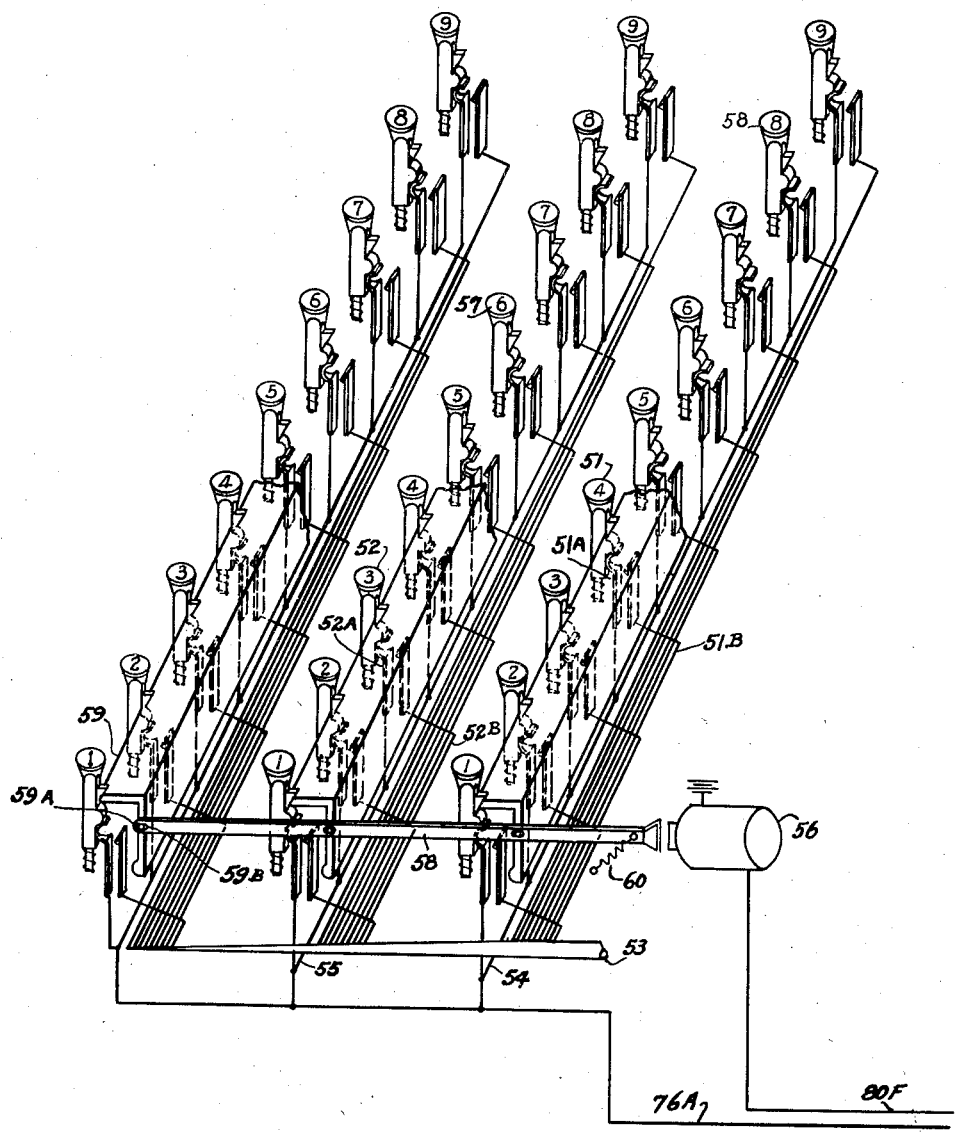

Multiplicand keys. Fig. 1

In Fig. 1 three rows of keys numbered 1 to 9 in each row are shown which are selectively pressed to set up succesive numbers in addition or subtraction or to set up a multiplicand in multiplication. These keys selectively prepare for energization of the counting or multiplicand relays shown in the upper part of Fig. 3.

The keys shown in Fig. 1 are conventional lock down contact-closing keys. Releasing means common to all of these keys are provided for releasing locked down keys at the end of a computation. The locking and releasing means includes a locking bar as 59 for each row of keys. These bars are operative to retain a depressed key in any row in locked down position. The several bars are connected to the release bar 58 by pins as 59A through slots as 59B. The bar 58 is normally held in position to retain the bars as 59 in locking position by a spring 60 and is moved to effect release of locked down keys by energization of the magnet 56. Once depressed a key stays in its locked down position until released by the energization of the magnet 56 or the depression of another key in the same row.

Each key operates a contact as 52A. One side of each contact associated with each key in each row is connected to a common conductor, as 55, and these common conductors for each row are connected to a grounding conductor 76A which leads to one side of a contact associated with the starting key 76 (Fig. 2), the other side of which contact is grounded whereby when the key 76 is depressed the sides of the contacts connected to the common conductors, as 55, are grounded. The key 76 is not of the lock down type. The other side of each contact associated with each key shown in Fig. 1, as for example the contact 52A, is respectively connected to a conductor as 52B, and these conductors, leading from said other side of these contacts, are wired in a cable 53 which, in the drawings, terminates in Fig. 1 and reappears in Fig. 3.

Figure 2:
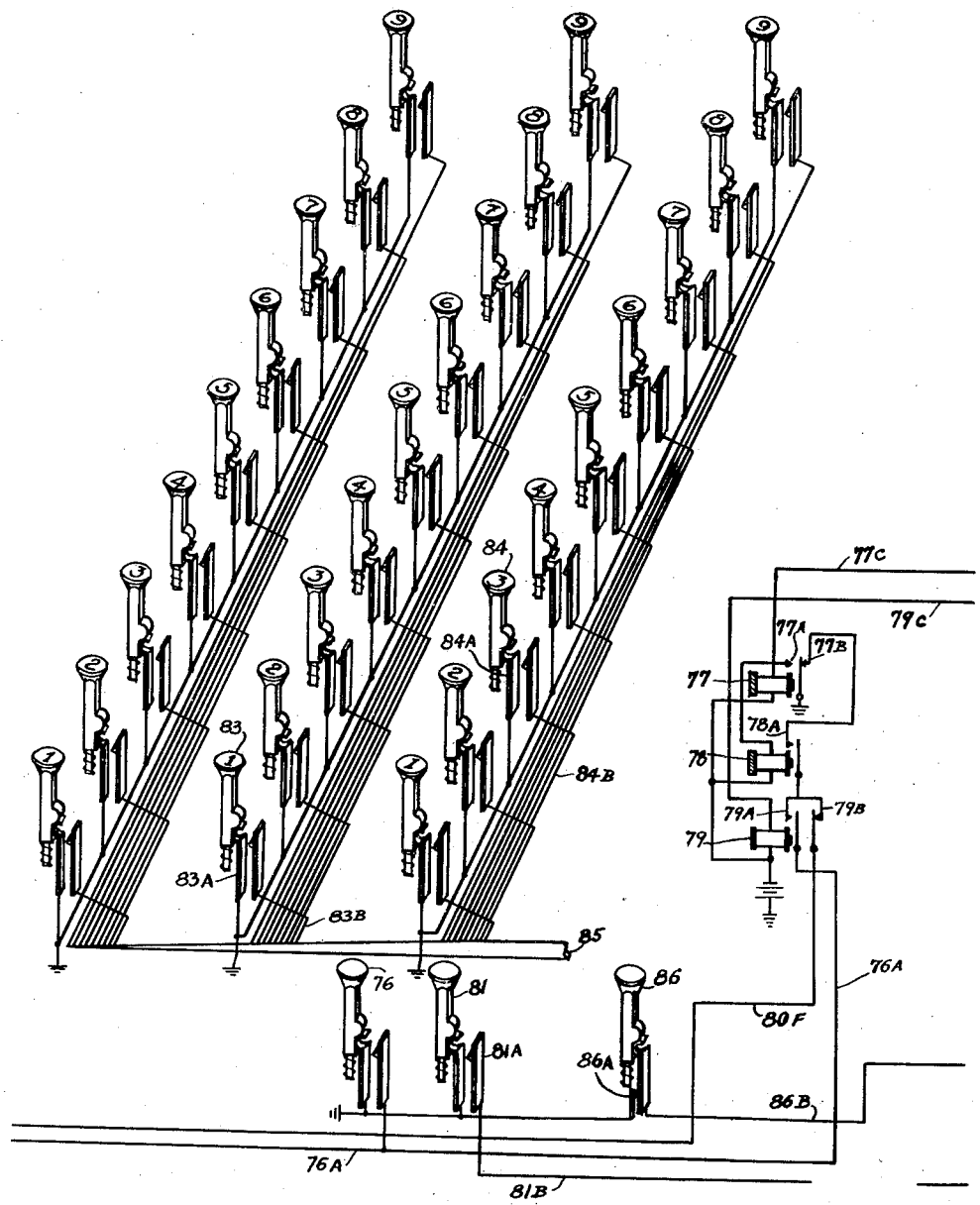
Fig. 2 is a diagrammatic perspective view of the multiplier keys and the starting, zero-setting and error correction keys and wherein certain control relays are diagrammatically illustrated.

Multiplier and control keys. Fig. 2

The bank of keys shown in Fig. 2 are for the purpose of setting up a multiplier and are referred to hereinafter as the multiplier keys. They are arranged in three rows and are numbered 1 to 9 in each row. When pressed these keys effect energization of the multiplier relays shown in the lower part of Fig. 3. These keys are of a conventional non-locking contact-closing type. One side of a contact associated with each key is grounded and conductors respectively lead from the other side of each contact and are wired in a cable 85 terminated in Fig. 2 and reappearing in Fig. 3.

The control key 76 is the starting key for the purpose of setting the machine in operation by energizing the counting relays through circuits prepared by locking down of selected of the keys shown in Fig. 1.

Control keys 81 and 86 are of a conventional non-locking contact-closing type and a contact is associated with each of these keys, one side of which is grounded. The other side of the contact associated with key 81 is connected through a conductor 81B to devices, explained more fully hereinafter, for effecting a zero-setting operation in the amount manifesting device or registers shown in Fig. 4. Contact 86A associated with key 86 is normally closed. The other side of the contact 86A is connected through a conductor 86B with devices for grounding those multiplier relays in Fig. 3 that are to be locked up. When it is desired to correct an error arising from the pressing of one or more incorrect multiplier keys, key 86 is pressed whereby contact 86A is opened and any locked up multiplier relays are released, as explained more fully hereinafter.

Thus key 81 is a zero-setting key and key 86 is an error correcting key.

Key release and multiplicand relays. Fig. 2

Relays 77 and 78 are slow-to-release relays. When energized they effect momentary energization of the release magnet 56 (Fig. 1) or they effect grounding of depressed multiplicand keys of Fig. 1 in a multiplying operation, as will be explained more fully hereinafter.

Relay 77 is energized by the closing of contacts as 7C (Fig. 3) on all energizations of the counting relays (Fig. 3) effected in a manner described more fully hereinafter. When energized, relay 77 opens contact 77B and closes contact 77A whereby ground is applied to relay 78 which then energizes and closes contact 78A. Contact 78A prepares a circuit to contacts 79A and 79B. If relay 79 is deenergized a circuit is prepared through contact 79B and conductor 80F to magnet 56. Relay 77 is deenergized by opening of contacts as 7C upon release of the counting relays and when relay 77 releases, contact 77B closes and grounds, wherefor release magnet 56 is energized through the circuit including contacts 78A and 79B. The release of relay 77 opens contact 77A which deenergizes relay 78 and when this relay subsequently releases, contact 78A is opened whereupon magnet 56 is deenergized. Hence magnet 56 is only momentarily energized.

Relay 79 is for the purpose of shifting the circuit prepared by contact 78A from the release magnet 56 to grounding conductor 76A in a multiplying operation. Relay 79 is energized, as will be more fully explained hereinafter, through conductor 79C and contacts as 18X (Fig. 3) of the multiplier relays until during the last operation of a multiplying operation. When energized, relay 79 closes contact 79A and opens contact 79B. The opening of contact 79B breaks the circuit to the release magnet 56. The closing of contact 79A prepares a circuit for momentarily grounding the contacts associated with locked down keys in Fig. 1 in each round of a multiplying operation. Relay 79 releases near the end of a multiplying operation whereupon contact 79A is opened and contact 79B is closed so that the release magnet 56 will be energized upon completion of the multiplying operation whereby locked down keys in Fig. 1 will be released at the end of the operation.

Figure 3:
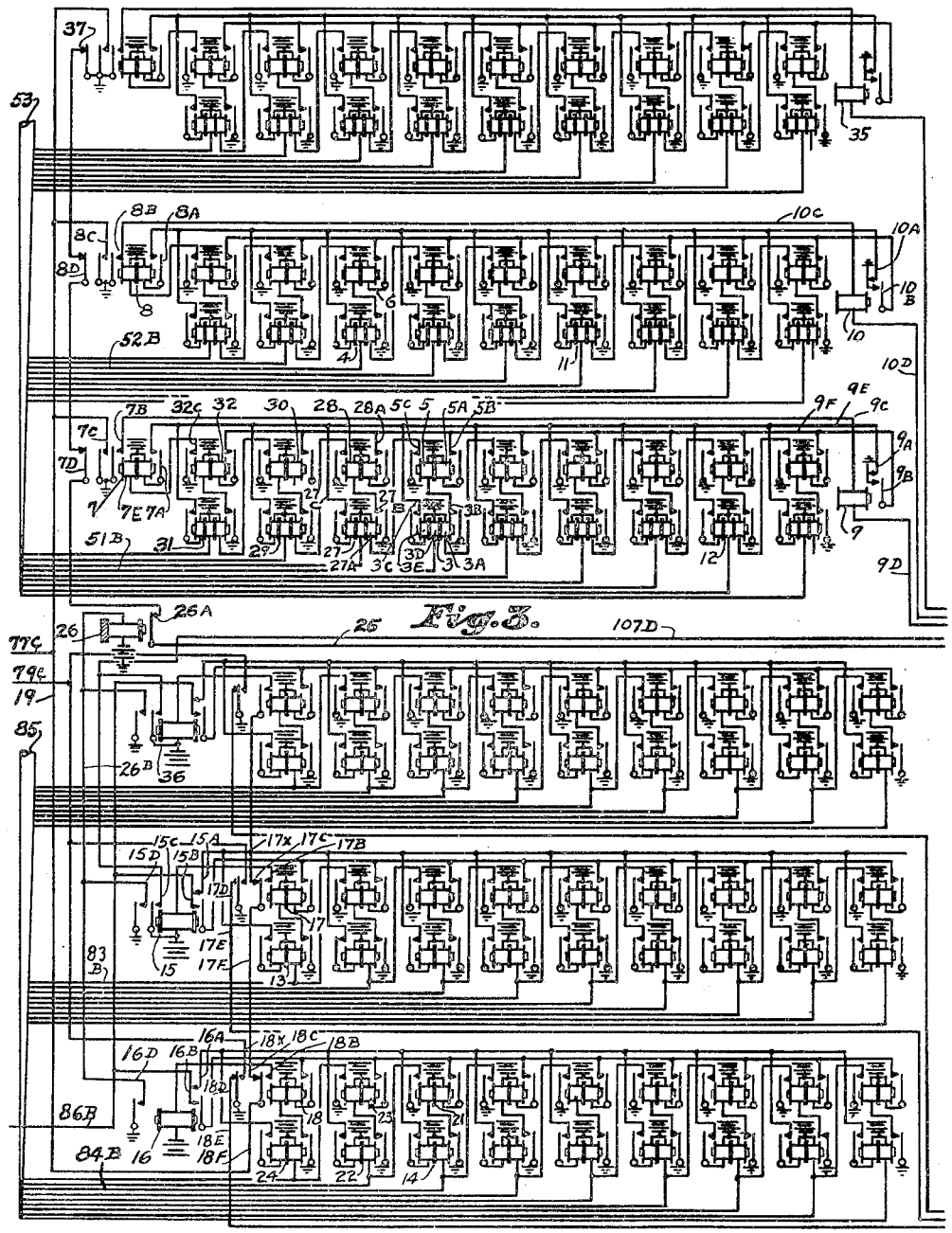
Fig. 3 is a diagrammatic view of the counting or multiplicand and multiplier relays.

Counting or multiplicand and multiplier relays. Fig. 3

Figure 4:
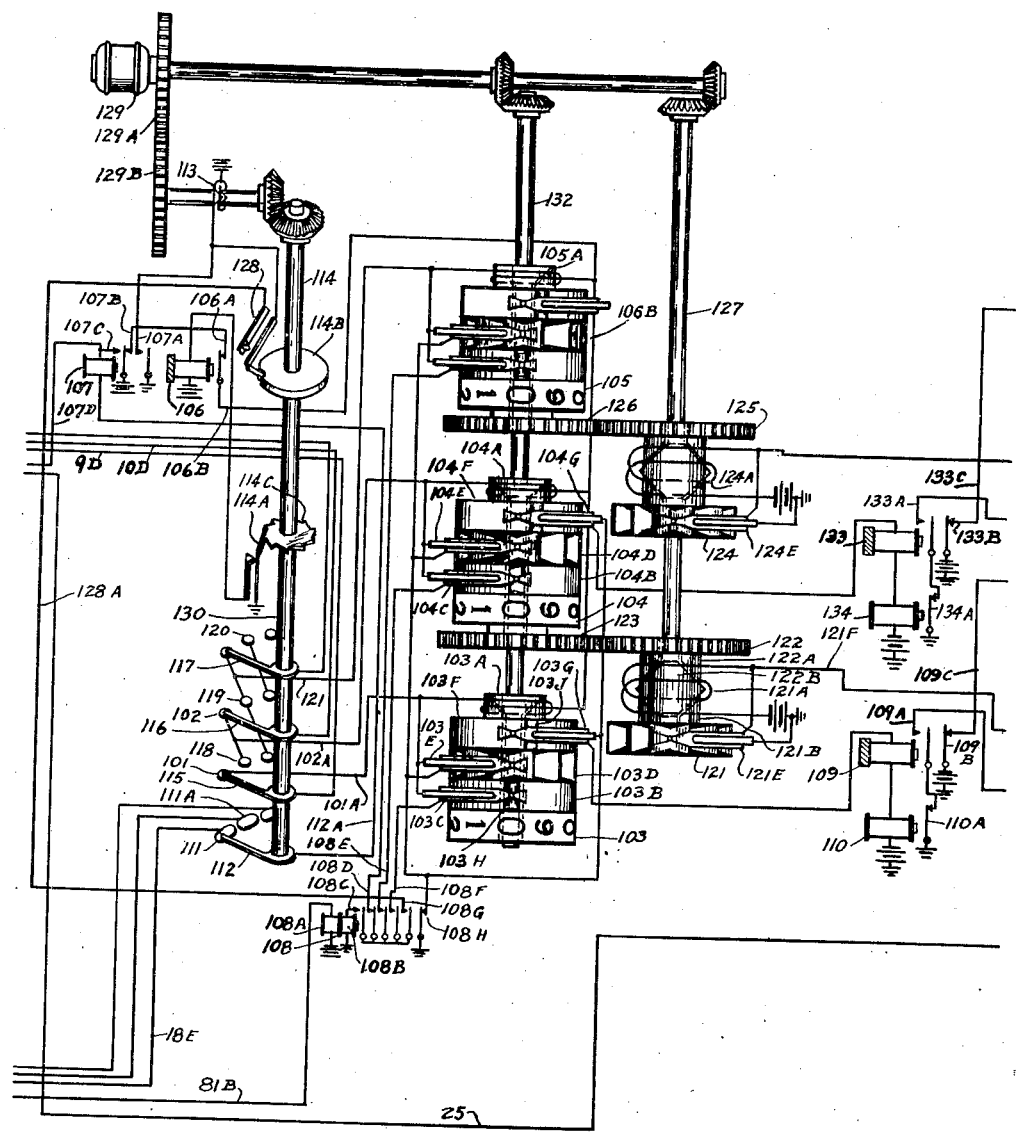
Fig. 4 is a partially diagrammatic view of the amount manifesting device and order switching mechanism and wherein certain control relays are diagrammatically illustrated.

Two sets of relays are shown in Fig. 3; the upper set consisting of the upper three groups are the counting or multiplicand relays. They take up the setting of the keys of Fig. 1 and, in a manner to be explained, effect registration of this setting in the amount manifesting device (Fig. 4). The lower three groups are the multiplier relays. They are set up by the multiplier keys of Fig. 2 and effect repeated grounding of contacts associated with depressed keys of Fig. 1 to thereby repeatedly energize multiplicand relays for repeated registrations in multiplying operations, as will later be described. Three groups of counting or multiplicand relays and three groups of multiplier relays are illustrated, the lowermost group in each class representing the units order, the middle group the tens order and the uppermost group the hundreds order. The relays in each group are arranged in a chain of two rows. The relays in the rows are paired whereby nine pairs of relays respectively for the digits 1 to 9 are provided. Each group of counting relays also includes a cut-off and a stepping relay.

Each relay in the lower row of the three groups of counting relays as 3, 27, 29 and 31 has three windings as 3A, 3D and 3E. A conductor leads from the middle winding of each of these relays to a contact associated with a like positioned key in Fig. 1. For example, a conductor 51B leads from the middle winding 3D of the relay 3 for the digit 4 of the units order of counting relays to the contact 51A associated with the key 51 (Fig. 1) for the digit 4 in the units order row of keys in Fig. 1. When the key 51 is depressed, the contact associated therewith is closed and the winding 3D is prepared for energization. This energization is momentary and is effected either by pressing key 76 or closing of contact 77B when contacts 78A and 79A are closed. Relay 3 once energized locks up through winding 3E, contact 3C, conductor 9E and contact 9A of stepping relay 9 so long as contact 9A is closed, that is to say, so long as stepping relay 9 is deenergized. Other relays in the lower rows of the three groups of counting relays are similarly prepared for energization by the depression of the correspondingly positioned key in Fig. 1 and are locked up by depression of starting key 76 or grounding of conductor 76A from contact 77B as above described.

When a relay in the lowermost row of the three groups of counting relays is energized and locked up, its mate positioned immediately thereabove, and the pairs of counting relays in the same group and of less numerical value are also energized and locked up. Thus when relay 3 for the digit 4 in the units order is energized and locked up its mate 5 is energized through contact 3B which is closed when relay 3 energizes. Energization of relay 5 closes contact 5C which energizes relay 27 through winding 27A. This closes contact 27B whereby relay 28 is energized and in like manner the remaining relays in this group of counting relays and of less numerical value than the first energized relay in the group are energized and locked up.

Energization of relays in the upper rows of counting relays, as relays 5 and 28, closes contacts as 5B thereof. This prepares a circuit through conductor 9F to contact 9B of stepping relay 9 for a purpose to be explained presently.

The cut-off relay 7 is in addition to the pairs of counting relays. The relay 7 energizes when the upper relay 32 for the digit 1 in the units order of counting relays is energized, energization of relay 32 closing contact 32C whereby relay 7 is energized through its winding 7E. Energization of relay 7 closes contact 7A to afford a stick or holding circuit through conductor 9E and contact 9A whenever relay 9 is deenergized.

Energization of relay 7 also closes contact 7C whereby through conductor 77C relay 77 is energized and closing of this contact also energizes relay 16 or similar relays 15 and 36 in a multiplying operation, for a purpose to be explained. Relay 16 or similar relays 15 and 36, as will be explained more fully hereinafter, are for the purpose of releasing pair by pair the associated locked up multiplier relays.

Energization of relay 7 also closes contact 7B, after the closing of contact 7C, whereby a circuit is closed through conductor 9C, relay 9, conductor 9D to the clutch 103A of the wheel unit of the manifesting device that includes the number wheel 103, this being the wheel unit for the units order. This circuit will be explained more fully hereinafter. Such closing of contact 7B energizes relay 9 whereby contact 9B is closed and contact 9A is opened with a make-before-break effect for a purpose explained more fully hereinafter.

Relay 7 deenergizes during the entry of the last digit on the number wheel 103, as will be explained more fully hereinafter, with the effect of stopping this number wheel when the entry of the digit has been completed, this being effected by opening of contact 7B upon deenergization of relay 7. Contact 7C also opens upon deenergization of relay 7 to deenergize relays such as 16 and relay 77.

Relay 7 also includes a contact 7D which is in circuit with the contact 26A of slow-to-release relay 26 and contact 7D closes upon release of relay 7, whereby if similar contacts of the other cut-off relays are closed and the slow-to-release relay 26 is released, circuit is closed through the contact 26A to effect a carry-over operation explained more fully hereinafter. Relay 7 is the last in a chain of counting relays to release and therefore contact 7D does not close until all of the counting relays in the chain have been released and consequently a carry-over operation cannot be effected until all of the counting relays have been released.

Relay 7 is energized initially through contact 32C of the upper relay of the No. 1 pair of counting relays and is held energized through this contact as long as this relay is energized, but upon deenergization of relay 32 control of relay 7 passes to contact 9A through contact 7A.

The cut-off relay 7 for the units order of the counting relays has been described in detail and it is to be understood that similar cut-off relays are associated with the counting relays for the tens and hundreds order and that these cut-off relays control energization and deenergization of the clutches of the number wheel units for the tens and hundreds orders. If counting relays for additional orders were provided as for thousands, etc., similar cut-off relays for the counting relays for these orders would be provided.

A stepping relay is associated with the counting relays for each order as 35 for the hundreds order, 10 for the tens order and 9 for the units order. These relays are for the purpose of releasing a pair of counting relays for each digit advance of the number wheel of the connected number wheel unit. They are energized through a contact as 7B on the associated cut-off relays as 7 as before described and are deenergized and reenergized by the movement of a shunting wheel as 103D of the number wheel unit for the particular order as the number wheel of the unit moves from digit to digit. Shunting wheels as 103D close and open shunting contacts as 103E during each digit advance of the associated number wheel.

Referring particularly to the stepping relay 9 which is typical of all the stepping relays, it is provided with, as before indicated, make-before-break contacts 9A and 9B. Referring also to the heretofore described energization of relay 3 and associated relays of lower value the first energization of relay 9 by the closing of contact 7B closes contact 9B and opens contact 9A. Opening of contact 9A frees conductor 9E from ground whereupon relay 3 is released through contact 3C.

Contact 9B grounded conductor 9F before ground was removed from conductor 9E. As explained, contact 5B of relay 5 is connected to conductor 9F and prepares a stick or holding circuit through winding 5A of relay 5. Hence when conductor 9F is grounded relay 5 is held energized through contact 9B notwithstanding the deenergization of relay 3 and opening of contact 3B.

During the entry of the first digit on the number wheel 103 the shunting wheel 103D closes contact 103E whereby, as will be explained more fully hereinafter, conductor 9D is grounded, deenergizing relay 9, closing contact 9A before the opening of contact 9B. Closing of contact 9A causes relay 27 to be held energized through its left hand winding as viewed in Fig. 3 and its contact 27C which is connected to conductor 9E that is grounded when contact 9A closes. Thus when contact 9B opens upon deenergization of relay 9 and conductor 9F is freed from ground and relay 5 deenergized but relay 27 remains energized through its contact 27C.

Prior to the time the first digit is entered on the number wheel 103, shunting wheel 103D opens contact 103E freeing conductor 9D from ground whereupon relay 9 reenergizes closing contact 9B and opening contact 9A whereby relay 27 is released, but its mate relay 28 remains energized through contact 9B in the same way as relay 5 remained energized subsequent to the release of relay 3. Relay 28 remains energized until conductor 9D is grounded at a time during the entry of the second digit on the number wheel 103 corresponding to the time during the entry of the first digit when shunting wheel 103D closed contact 103E grounding conductor 9D. This grounding of conductor 9D during the entry of the second digit has the effect of releasing relay 28 and holding relay 29 in the same manner as that in which the prior deenergization of relay 9 released relay 5 and held relay 27. Prior to the time the entry of the second digit on the number wheel 103 is completed the shunting wheel 103D opens contact 103E whereby relay 29 is released but relay 30 is held.

The foregoing operation continues releasing the counting relays in the manner described until during the entry of the last or fourth digit on the number wheel 103 when the shunting wheel 103D closes the contact 103E with the effect of releasing relay 32. This, however, does not release the cut-off relay 7 which is held through the closed contact 9A. However, just prior to the time the entry of the last digit on the number wheel 103 is completed the shunting wheel 103D opens contact 103E freeing conductor 9D from ground whereupon relay 9 reenergizes. This opens contact 9A whereupon relay 7 releases and then relay 9 and clutch 103A release. This releasing of the clutch occurs at the time the entry of the last digit on the number wheel 103 is completed.

In the manner above described the counting relays for the tens and hundreds and additional orders cause digits to be entered on the number wheel for these orders.

Thus since pairs of counting or multiplicand relays corresponding in number to the number to be entered in a particular order are locked up and as these pairs of relays are successively released in declining sequence as the digits are entered on the number wheel for the order in ascending sequence, and as the release of the upper relay of the last or lowermost pair of counting or multiplicand relays is immediately followed by the release of the cut-off relay for the order during the entry of the last digit and as this is immediately followed by the release of the clutch of the number wheel for the particular order, which occurs when the last digit is fully entered on the number wheel, it is clear that a digit corresponding to the number of locked up pairs of counting or multiplicand relays in a particular order is entered on the number wheel for the order.

The multiplier relays are arranged and act in the same manner as the counting relays except that they are not provided with cut-off relays and the relays 16, 15 and 36 at the left hand end of the chains thereof serve as stepping relays. Furthermore, the upper relay of the No. 1 pair of relays for each order, as 17, is provided with special contacts as 17B, 17X and 17D and all multiplier relays have but two windings.

The multiplier relays are energized by momentarily closing the contacts associated with the multiplier keys shown in Fig. 2 which is effected by momentarily depressing one of the keys. There is a key for each pair of multiplier relays and, as with the keys of Fig. 1 and the counting relays, the contact associated with each multiplier key in Fig. 2 is respectively connected to a correspondingly positioned relay in the groups of multiplier relays of Fig. 3.

One side of the contact 84A associated with the key 84 has a wire 84B connected thereto and the wire 84B and similar wires from the contacts associated with the contacts of the other multiplier keys are wound in a cable 85 which terminates in Fig. 2 but reappears in Fig. 3. The wire 84B, as shown in Fig. 3, is connected to the right hand winding of the relay 14, the lowermost relay of the pair of relays for the digit 3 in the units order. Thus when key 84 is depressed relay 14 is energized and as with the counting relays this effects energization of the relay 21, the other relay of the No. 3 pair of multiplier relays. Energization of relay 21 in turn effects energization of relay 22 which in turn effects energization of relay 23, and this in turn effects energization of relay 24 which in turn effects energization of relay 18. As the foregoing relays energize they are locked up through stick or holding circuits controlled by make-before-break contacts 16A and 16B associated with the relay 16. Thus when a pair of multiplier relays is energized all relays of lower value in the same order are also energized.

The foregoing specific description particularly relates to the multiplier relays for the units order but the multiplier relays for the tens and hundreds orders, and any additional orders if provided for, are arranged and operated in like manner.

The lowermost group of multiplier relays is for the units order, the middle group for the tens order and the upper group for the hundreds. These relays become effective one group at a time, the units first. Each group of multiplier relays includes a control relay as 16 for the units, 15 for the tens and 36 for the hundreds. Relays as 16 are prepared for energization by the closing of contacts as 18B upon the energization of relays as 18 which are the last of the group to deenergize. Relays as 16 are energized from contacts as 7C through conductors 18F and 19 and contacts as 18B, for relay 16, when relays as 18 are energized. Relays as 15 are energized from contacts as 7C, through conductors 18F and 19 and contacts as 18C and conductors as 17F when relays as 18 are deenergized. The control relays are energized by the first of contacts as 7C to close and are deenergized by the last of contacts as 7C to open. This energization and deenergization is effected once for each time a number set up in the multiplicand relays by the multiplicand keys of Fig. 1 is to be entered in the manifesting device, that is to say, on the number wheels and this effects a multiplying operation. The multiplier relays are released by make-before-break contacts as 16A and 16B and they release a pair at a time for each digit in the multiplier in the manner above described for the counting relays, relays as 16 functioning in the manner of stepping relays as 9.

Thus if a number has been set up in the multiplicand relays and if, for example, this number is to be multiplied by 3, the key 84 is depressed energizing the relay 14 and its mate and all other relays in the group of lower numerical value in the units order of the multiplier relays. When the first entry of the number set up in the counting relays is completed the relays 14 and 21 will have been released; when the second entry of the number set up in the counting relays is completed the relays 22 and 23 will have been released; when the third or final entry of the number is completed the relays 24 and 18 will have been released.

The multiplier relays in the other orders and the multiplier relays for orders higher than the units order operate in a similar manner and it will thus be seen that a number set up in the counting relays is entered as many times for each order as there are multiplier relays locked up for that particular order. When the last or No. 1 pair of multiplier relays for any particular order release, as the relay 18, the contact thereof as 18B is opened which disables the relay as 16 for this order.

Releasing of relay 18 for the units order closes contact 18C which transfers the circuit from contacts as 7C and conductor 18F to conductor 17F and contact 17B to the control relay 15 for the tens order. Thus the control relay for the tens order will not be energized until the control relay for the units order is deenergized for contact 18C does not close until relay 18 releases and this opens contact 18B which disables relay 16. Therefore all multiplication by multiplier relays to be effected in the units order is completed before multiplication by multiplier relays in the tens order is begun, and this is also true insofar as the tens and hundreds and any higher orders are concerned, that is to say, multiplication under control of the multiplier relays of a lower order is always completed before multiplication under control of the multiplier relays for a higher order is begun.

In event there is to be no multiplication under control of multiplier relays for the units order contact 18B will be opened and the circuit will be immediately closed through contact 18C to the tens order and so on from the tens order to the hundreds order and for any higher orders. Moreover, if multiplication is to be effected, for example, first under control of multiplier relays for the units order and next by multiplier relays for the hundreds order as when no multiplier relays for the tens order are locked up, the contact 17B will be opened and the contact 17C will be closed so that when the contact 18B opens and the contact 18C closes circuit will be immediately transferred to the hundreds order.

The energization of relays as 18 closes contacts as 18X whereupon relay 79 is energized by reason of the grounding of conductor 79C. Energization of relay 79 closes contact 79A and opens contact 79B which, as stated, breaks circuit to the releasing magnet 56 and prepares a circuit for momentarily grounding conductor 76A on all repeated entries of the numbers set up in the multiplicand relays after the first entry. It will be seen that energization of relay 79 is under control of the lowermost relay of the multiplier relays for the various orders, and therefore when the lowermost relay of the highest order having multiplier relays locked up therein deenergizes the relay 79 releases, closing contact 79B. Slow-to-release relays 77 and 78 will be energized at this time but when relay 77 releases contact 77B closes grounding contacts 78A and 79B and conductor 80F to energize release magnet 56 whereupon locked down keys of Fig. 1 are released. Relay 78 next releases to open contact 78A whereby magnet 56 is deenergized.

When relays as 18 release, contacts as 18D ground conductors as 18E (Fig. 3) and conductor 18E (Fig. 4), contact 111, wiper 112, conductor 112A and relay 107, battery being subsequently supplied to this relay through conductor 107D (Fig. 4), conductor 107D (Fig. 3), and contacts as 15C associated with control relays for the tens and higher orders. Therefore closing of contacts as 15C energizes relay 107 which has the effect of setting shaft 114 of the order switching mechanism in motion by grounding of clutch 113 from contact 107A, as explained more fully hereinafter. The effect of movement of the shaft 114 is to shift wipers as 112 to advance the multiplying action to a higher order as is also explained more fully hereinafter.

Relays 16, 15 and 36 have contacts as 16D which control energization of the carry-over control slow-to-release relay 26, as will be explained more fully hereinafter.

*Order switching mechanism. Fig. 4*

In Fig. 4 I have conventionally illustrated a motor 129 and have shown shafts and gears 129A and 129B for imparting rotation to the several shafts shown in Fig. 4.

The shaft 114 is part of a switch generally indicated by 130 for shifting the operating circuits of the multiplicand relays (Fig. 3) from a lower order to a higher order of number wheels as multiplication advances from lower to higher orders of multipliers and also for returning the apparatus to initial or units order position during a zero-setting operation. The shaft 114 is driven by the clutch 113 under control of relay 107 in a multiplying operation and under control of cam 114B, contact 128, conductor 128A and contact 108G of zero-setting relay 108 in a zero-setting operation. In each movement of shaft 114 to shift wipers as 112 from one contact to the next higher contact, the toothed wheel 114C closes contact 114A to energize slow-to-release relay 106. Energization of relay 106 prevents energization of clutches as 103A during movement of the shaft 114 inasmuch as circuit to battery through contact 107B is opened by the energization of relay 106 opening contact 106A.

Shaft 114 carries a wiper 112 for setting up one leg of a circuit to advance the shaft from one step to the next and it also carries wipers 115, 116 and 117 for advancing the operating circuits of the multiplicand relays to higher orders in a multiplying operation. Each wiper has access to three contacts in the present instance, where number wheels are provided in the manifesting device for three orders of numbers and a greater or less number of contacts would be provided for cooperation with the wipers depending upon the number of number wheels provided. These contacts are so wired that wiper 115 in its first or normal position is connected through contact 101, and conductor 101A to clutch 103A of the number wheel for the units order; in its second position through contact 118, and conductor 102A to clutch 104A of the number wheel for the tens order; and in its third position through a contact and conductor with the clutch 105A of the hundreds order.

When the wiper 115 is connected to the clutch 103A of the units order, the wiper 116 is connected to the clutch 104A for the tens order and the wiper 117 to the clutch 105A for the hundreds order. These wipers remain in these normal positions for a multiplication effected by locked up multiplier relays in the units order and during addition. When, however, multiplication is to be effected by locked up multiplier relays in the tens order, the wipers engage the second contacts and similarly the wipers engage the third contacts when multiplication is to be effected by locked up multiplier relays in the hundreds order and if additional orders were provided for, the wipers would successively advance in this manner.

Wiper 112 controls shifting of the shaft 114 and the contacts 111, 111A, etc. with which it cooperates are so sized that wiper 112 makes contact with contact 111A before its engagement with contact 111 is broken and so on as it progresses upwardly through the various orders. This is for the purpose of insuring a full step of the shaft 114 on each movement and it also provides for movement of the shaft through the tens order without stopping in event no multiplier relays in the tens order are locked up but multiplier relays in the units order and hundreds order are locked up. When this condition occurs the contact 111A will be grounded as well as the contact 111 and hence the relay 107 will remain energized with the effect of keeping contact 107A closed which holds ground on the clutch 113 to maintain energization thereof. Similarly if a thousands order were provided for, the wiper 112 would continue on through the hundreds order in event no multiplication was to be performed under control of multiplier relays locked up in the hundreds order and this would be equally true of other higher orders if provision were made therefor.

Zero-setting mechanism. Fig. 4

Relay 108 is the zero-setting relay. It is energized by momentary depression of key 81 (Fig. 2) which results in closing contact 81A to supply ground through the left hand winding of relay 108A of relay 108. Once energized relay 108 remains energized through winding 108B, contact 108C, contact 108F, and zero-setting contacts as 103C. The zero-setting contacts as 103C are under control of zero-setting wheels as 103B associated with each number wheel unit. So long as any number wheel is off its zero position the zero-setting wheel of the unit maintains the zero-setting contact associated therewith closed and conversely when each number wheel reaches zero the zero-setting wheel associated therewith permits opening of its zero-setting contact. Thus when the last number wheel attains zero position the last of the zero-setting contacts is opened which frees winding 108B of battery and this results in releasing of relay 108.

Relay 108 includes a contact 108H which is opened when relay 108 is energized and this prevents grounding of contacts as 103G, during a zero-setting operation, the purpose of which will be explained more fully hereinafter.

When relay 108 is energized ground is applied to the clutches of the number wheel units which thereupon energize, if the number wheel thereof is off zero position, and this returns the number wheels to zero position, as will be explained more fully hereinafter.

Number wheel units. Fig. 4

Heretofore reference has been made to the number wheel units which together constitute the amount manifesting device, that is to say, the results of computations are registered on these wheels.

Each wheel unit is made up of a number wheel as 103, a zero-setting wheel as 103B with which contacts as 103C cooperate, a shunting wheel as 103D with which contacts as 103E cooperate, a carry-over contact closing wheel as 103F with which contacts as 103G cooperate, and a clutch as 103A. The several wheels of each unit and the female portion of the clutch are rotatably mounted on the shaft 132; the male portion of the clutch is attached to the shaft; and the magnetic field of the clutch is stationary. When the field is energized the male and female portions are engaged whereby the wheel unit is connected to and rotates with the shaft 132.

The zero-setting wheels as 103B and the contacts as 103C which cooperate therewith are effective in a zero-setting operation. The wheel has a drop therein at zero position and a dwell on opposite sides of the drop or notch so that as long as the number wheel is off zero position the rider of the associated contact is disposed out of the notch whereby the contact is closed. When, however, the wheel attains zero position the rider passes into the notch and the contact is opened which breaks a circuit to the clutch and stops the wheel unit in zero position.

The shunting wheels as 103D are equipped with a lobe between each digit position of the associated number wheel. A rider on the contacts as 103E, which cooperate with these wheels, rides up and down on each lobe during each digit advance of the number wheel whereby the contacts as 103E are closed and opened for each digit advance of the associated number wheel.

The contacts 103E close to shunt out stepping relays as 9 on each digital movement of the associated number wheel. These contacts are grounded through contact 108H when the zero-setting relay 108 is deenergized. Since contact 108H is open during a zero-setting operation closing and opening of contacts as 103E during such an operation is without effect. These contacts shunt out the stepping relays as 9 by grounding conductors as 9D. The conductors as 9D are the battery conductors for the stepping relays as 9, ground for these relays being found at the contacts as 7B of the cut-off relays. Thus, when contacts 103E open shortly after the closing thereof battery is again supplied to stepping relays as 9.

Referring particularly to the stepping relay for the units order of counting relays which is typical of all other stepping relays and circuits thereof, relay 9 is grounded through conductor 9C and contact 7B upon closing of said contact 7B. Battery is supplied to said relay through conductor 9D, wiper 115, contact 101, conductor 101A, clutch 103A, conductor 106B, which is common to all of the clutches associated with the number wheel units of the manifesting device. Conductor 106B leads to contact 106A of relay 106 which in turn is connected with contact 107B of relay 107, which contact 107B is closed as long as relay 107 is deenergized and it is connected to battery.

Contacts as 103E are connected to conductors as 101A intermediate contacts as 101 and clutches as 103A. Therefore when contacts as 103E are closed, ground is maintained on the clutch 103A which therefore remains energized but the effect of closing contact 103A is to shunt out battery to stepping relay as 9 inasmuch as two grounds and no battery are applied to this relay. Hence it is the closing and opening of contacts as 103E which effects the alternate deenergization and energization of stepping relays as 9 during the time a number set up in the counting relays is being registered on the number wheels, these contacts effecting this alternate deenergization and energization of the stepping relays as 9 in the manner and at the time heretofore explained.

Each wheel unit includes a carry-over contact-closing wheel as 103F which is equipped with a lobe 103J engageable with a rider of contacts as 103G. These lobes are positioned to effect closing of contacts as 103G during passage of a number wheel from 9 to 0 during advance thereof in a registering operation which is indicative that, during addition or multiplication, a carry-over is to be made to the next higher order. Closing of contacts as 103G energizes relays as 109 and 110 for the purpose of entering a carry in the carry-over device, as explained more fully hereinafter, whenever a carry-over is required.

Contacts 103G and 104G associated with the carry-over contact-closing wheels of the wheel units for units and tens orders are grounded through contact 108H as long as relay 108 is deenergized. Thus whenever the contact 108H is closed and lobes as 103J close contacts as 103G, relays 109 and 110 are grounded whereupon they energize. Relays 133 and 134 are respectively identical with the relays 109 and 110 and are energized upon closing of the contact 104G. Contact 108H is open during a zero-setting operation and therefore closing of contact 103G or 104G during a zero-setting operation is without effect.

Associated with the number wheel units for those orders into which a carry-over may be made are carry-over entering devices. In the present arrangement where the lowest order represented is units and tens and hundreds orders are also provided for, a carry-over may be required from units to tens or from tens to hundreds. Thus a gear 123 is rigidly connected to the number wheel 104 and this gear meshes with a gear 122 rotatable on the shaft 127 and connected to part 122A of clutch 121A, which part is rotatable on shaft 127.

A shunting wheel 121 is connected to the part 121B of clutch 121A and this part and wheel are rotatable on shaft 127. The shunting wheel 121 is similar to the shunting wheel as 103D and is equipped with a lobe between each digit position of the number wheel 104. The gears 122 and 123 have a one-to-one ratio whereby the shunting wheel 121 moves in synchronism with the number wheel 104. Clutch 121A also includes a part 122B fast on shaft 127. When clutch 121A is energized, parts 121B and 122A are connected with part 122B whereby the gear 122 and shunting wheel 121 rotate with shaft 127. Shafts 127 and 132 operate synchronously so that rotation of shaft 127 is in direct timed relation with rotation of shaft 132. The manner in which the unit including shunting wheel 121 operates is explained more fully hereinafter.

A carry-over entering device identical with that just described is associated with the wheel unit for the hundreds order, gears 126 and 125 being provided which are identical respectively with the gears 123 and 122. A shunting wheel 124 is provided which is identical with the shunting wheel 121, and clutch 124A includes three parts that are connected to the elements of the unit in the manner in which the three parts of clutch 121A are connected to the elements of that unit. Identical carry-over entering devices would be provided for any higher orders provided for in the device.

Figure 5:
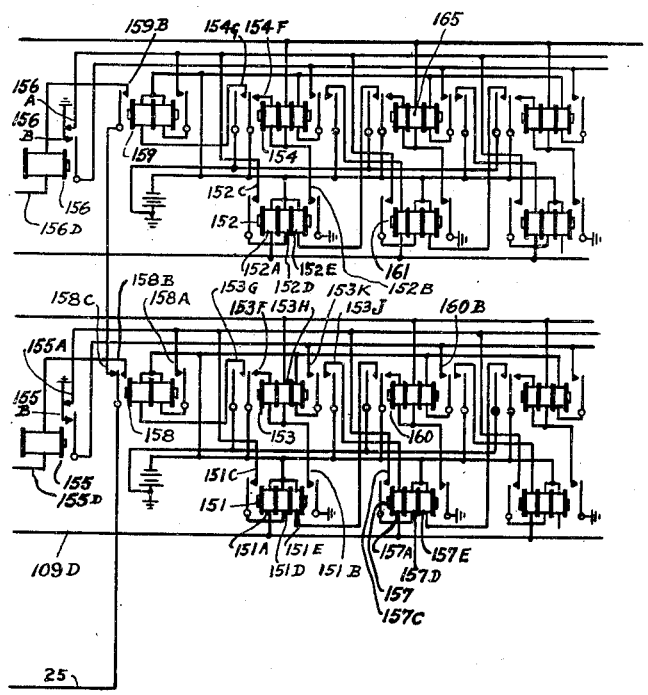
Fig. 5 is a diagrammatic view of the carry-over relays.

Carry-over relays. Fig. 5

The relays shown in Fig. 5 are for the purpose of effecting a carry-over from one order to the next higher order. Two groups of relays are provided, each consisting of two rows of relays—one relay in each row constituting one of a pair and each pair is for the purpose of effecting the carry-over of a single carry. The lowermost group is for the purpose of effecting a carry-over from the units order into the tens order and the uppermost group is for the purpose of effecting a carry from the tens order into the hundreds order. If additional orders were provided for additional groups would be provided.

In each group I have shown three pairs of relays whereby each group is capable of accumulating three carries and if more carries need be provided for it is only necessary to provide additional pairs of relays in each group and such additional pairs would be connected in the circuit in the manner in which the various illustrated pairs are connected, that is to say, such additional pairs of relays would merely be a duplication of those illustrated.

Carries are taken up for the respective orders cumulatively. Thus in a multiplying operation more than one carry from the units order to the tens order may be required and the first carry locks up the first pair of relays, the second carry locks up the second pair of relays and so on, and this is also true of carries from the tens order into the hundreds order.

A carry entered in the carry-over relays is stored therein until the end of the operation during which the carry is entered in the relays and this is effected by locking up the pair of relays in which a carry is entered.

If during an operation wheel 103 passes from 9 to 0 the lobe 103J on wheel 103F closes contact 103G whereby ground is momentarily applied to relays 109 and 110 which thereupon energize. The energization of relay 109 closes contact 109A. Contact 110A, however, is also open at this time but relay 110 deenergizes as soon as contact 103G opens. However, relay 109 remains energized since it is a slow-to-release relay. Thus when contact 110A closes, conductor 109D is grounded through contacts 109A and 110A. This grounds winding 151A of relay 151 whereupon relay 151 energizes if this is the first time conductor 109D is grounded in a particular computation. Energization of relay 151 closes contact 151C whereby ground is supplied to winding 151D of relay 151, thus providing a stick or holding circuit which maintains relay 151 energized. Relay 109 releases opening contact 109A and closing contact 109B. This does not release relay 151, however, since the winding 151D thereof is energized.

Energization of relay 151 closes contact 151B whereupon a circuit is prepared through winding 153H of relay 153. Contact 151B is grounded. Contact 109B is connected to battery. Therefore when contact 109B closes relay 153 is energized through its winding 153H. Energization of relay 153 closes contact 153F which is in circuit with the left hand winding of relay 153 that is also connected to grounded contact 151B. Contact 153F is connected to battery. Thus upon energization of relay 153 and closing of contact 153F a stick or holding circuit is provided for relay 153 so that if contact 109B is subsequently opened this relay is not released so long as relay 155 is energized.

Energization of relay 153 also closes contact 153K in circuit with contact 155B of stepping relay 155. The stepping relay 155 includes make-before-break contacts 155A and 155B. It will be recalled that relay 151 is locked up through contact 155A. Thus upon energization of relay 155 contact 155A will be opened and contact 155B will be closed before contact 155A opens. Therefore, even though contact 155B opens relay 153 will not release since it will be locked up through the right hand winding thereof which is in circuit with contact 153K that will at this time be grounded through contact 155B.

Energization of relay 153 closes contact 153G whereupon cut-off relay 158 is energized through its left hand winding, closing contact 158A thereof which is in circuit with contact 155A of stepping relay 155, the utility of which will be explained more fully hereinafter.

The energization of relay 153 also closes contact 153J whereby the left hand winding of relay 157 is connected to battery. This contact 153J was open when conductor 109D was grounded in the preceding operation and therefore relay 157 did not lock up at the time relay 151 locked up. However, if in this particular computation contact 103G again closes energizing relays 109 and 110, conductor 109D will again be grounded whereupon relay 157 will be energized which, in the same manner as that in which the energization of relay 151 effected energization of its mate 153, will effect energization of relay 160, the mate of relay 157. Energization of relay 160 will prepare the third relay in the lower row of the lower group of carry-over relays for energization should the contact 103G be closed for a third time in this particular computation and if additional relays were provided in the group this progressive preparation for receiving energization would proceed in the manner above described.

The relays in the upper group of carry-over relays are progressively locked up in the same manner as the relays in the lower group, these lower relays of the upper group being under control of the relays 133 and 134 which, as stated, correspond to and which function the same as the relays 109 and 110 and the relays 133 and 134 are energized under control of the contacts 104G of the tens order wheel unit.

Carries entered in the carry-over relays are entered on the number wheel of the amount manifesting device at the end of the computation in which the carries were accumulated in the carry-over relays. In a multiplying operation this is under control of the slow-to-release relay 26 in a manner explained more fully hereinafter. In an adding computation the relay 26 is not energized wherefore the contact 26A thereof remains closed and, in a manner to be explained more fully hereinafter, a carry is effected at the end of the entry of a number during addition, if the entry entails a carry.

The entry of a carry is effected by grounding of the conductor 25. If the contact 26A is closed grounding of conductor 25 is under control of contacts associated with the cut-off relays of the counting relays; namely, the contacts 7D, 8D and 37, and all of these contacts must be closed by the deenergization of all of the cut-off relays of the counting relays before conductor 25 is grounded. Hence since the cut-off relays of the counting relays are not deenergized until all of the counting relays are deenergized a carry-over cannot be effected until the counting relays, that is to say, the entry means, have completed their operation.

When carries are to be entered in the amount manifesting device, it is essential that they be entered progressively. For example, the carry from the units order to the tens order may cause the number wheel for the tens order to pass from 9 to 0 which will close the contact 104G and lock up another pair of relays in the upper group of carry-over relays. Hence, progressive entry of the carries insures accurate entry thereof.

In order to insure, in adding and in multiplying computations, that the carry-over from a lower order to a higher order will be effected progressively from the lowest to the highest the relay 158 is provided with contacts 158B and 158C. The relay 158 is energized whenever a carry has been entered in the lower group of carry-over relays. Such energization of the relay 158 disconnects conductor 25 from contact 158C and connects it with contact 158B. Contact 158C is connected with contact 159B controlled by the cut-off relay 159 of the next higher order and therefore even though the contact 159B of this higher order is closed a carry-over cannot be effected therefrom until relay 158 deenergizes which will be the last step in effecting a carry from the units to the tens order. An arrangement identical with this would be associated with the cut-off relay for the hundreds order of carry-over relays if provision were made for a carry-over from hundreds to thousands and an identical arrangement would be provided if a carry-over were to be effected into any higher order.

As has been explained, whenever a carry is to be effected from the units order to the tens order the cut-off relay 158 is energized wherefore the conductor 25 is connected to the contact 158B. The contact 158B is in series with the stepping relay 155 and the clutch 121A. Hence when conductor 25 is grounded and contact 158B is closed stepping relay 155 and clutch 121A are energized.

Energization of clutch 121A sets shunting wheel 121 and gear 122 in motion with shaft 127 and since gear 122 meshes with gear 123 the wheel unit for the tens order is set in motion. Shortly after the shunting wheel 121 is set in motion the shunting contact 121E associated therewith is closed. This shunting contact is connected to the conductor 121F which interconnects the relay 155 and clutch 121A. Closing of contact 121E grounds conductor 121F. This prevents deenergization of clutch 121A but deenergizes stepping relay 155. The wheel 121 continues to rotate and contact 121E opens whereupon relay 155 is reenergized before the entry of a carry is completed. Thus it will be seen that deenergization and reenergization of the stepping relay 155 is under control of the shunting wheel 121. This deenergization and reenergization of stepping relay 155 has the effect of releasing pair by pair energized carry-over relays in the lower group of such relays.

If, for example, pairs 157 and 160 and 151 and 153 of carry-over relays have been energized and conductor 25 is grounded relay 155 is energized and clutch 121A is engaged which sets wheel 121 in motion. The energization of relay 155 makes contact 155B and breaks contact 155A with a make-before-break effect. Breaking of contact 155A releases relay 157. However, relay 160 remains energized by reason of the fact that contact 155B is closed. But shortly after the wheel 121 starts to move contact 121E is grounded. This deenergizes relay 155 whereupon contact 155A is closed before contact 155B is opened. Opening of contact 155B releases relay 160 but relay 151 remains energized by reason of the fact that contact 155A is closed. However, prior to the time the first carry is entered on the number wheel 104 the contact 121E opens, reenergizing relay 155 making contact 155B before contact 155A is opened. Opening of contact 155A releases relay 151 but contact 155B holds relay 153 energized.

Wheels 104 and 121 continue to rotate and shortly after the start of the entry of the second carry on the wheel 104 contact 121E closes whereupon relay 155 deenergizes thus making contact 155A before opening contact 155B. When contact 155B opens relay 153 releases. This, however, does not release cut-off relay 158 which remains energized through its right hand winding under control of contact 155A. Shortly before the entry of the second carry is completed, contact 121E opens reenergizing stepping relay 155, closing contact 155B (without effect) and opening contact 155A. Opening of contact 155A deenergizes relay 158 which thereupon releases, opening contact 158B and closing contact 158C. Opening of contact 158B frees relay 155 and clutch 121A from ground whereupon relay 155 deenergizes and clutch 121A releases. The clutch releases at the time the entry of the second carry is completed.

It will be noted that deenergization of relay 158 closes contact 158C. Therefore, if a carry has been entered in the upper group of carry-over relays, contact 159B will be closed whereupon closing of contact 158C will apply ground to stepping relay 156 and clutch 124A through said contact 159B and this relay and clutch will be energized. Hence the hundreds wheel 105 will be set in motion so that any carry accumulated in the upper group of carry-over relays will be entered on the hundreds number wheel 105, this being effected under control of the contact 124E in the same manner as that in which the contact 121E controls the entry of a carry on the tens number wheel 104.

DESCRIPTION OF OPERATION

Adding and multiplying calculations and carry-overs entailed therein are described in detail hereinafter and the manner in which subtracting operations may be performed is briefly explained, such calculation in the main entailing reversing the direction of rotation of the number wheels of the result manifesting device.

The following detail descriptions are merely typical examples of calculations and any other numbers within the capacity of the machine could be added or multiplied in the manner hereinafter described.

*Addition*

For the sake of simplicity, the example of adding 34 to 34 is described herein. The first steps in this addition consists in registering 34 and this operation is then repeated to add 34 to the initially entered 34.

*Registering 34.*—The first step in registering 34 in the result manifesting device is to press and lock down the keys 52 and 51, the 3 and 4 keys in the tens and units order respectively. Pressing and locking down of key 51 closes contact 51A associated therewith and pressing and locking down of key 52 closes contact 52A associated therewith. After these keys are pressed down starting key 76 is momentarily depressed grounding conductor 76A which grounds conductor 51B through closed contact 51A. This energizes relay 3 which thereupon locks up in the manner previously described and which results in locking up its mate, relay 5, and the other pairs of relays of lower value in this group, that is to say, relays 27, 28, 29, 30, 31 and 32. Energization of relay 32 energizes cut-off relay 7.

Grounding of conductor 76A also grounds conductor 52B through closed contact 52A which causes relay 4 to be energized as well as its mate, relay 6, and those pairs of relays of lower value in this chain or group of relays and, as before described, this results in energization of the cut-off relay 8.

Thus in the foregoing manner counting relays for 3 in the tens and 4 in the units are locked up.

Energization of relay 7 closes contact 7B grounding conductor 9C energizing relay 9 and engaging clutch 103A. Energization of relay 8 closes contact 8B grounding conductor 10C which energizes stepping relay 10 and engages clutch 104A.

Engagement of clutches 103A and 104A sets the number wheel units including the number wheels 103 and 104 in motion with shaft 132. As the wheel 104 rotates shunting wheel 104D closes and opens shunting contact 104E whereby the relays 4 and 6 and other relays of less numerical value in this group successively release and during the entry of the third digit the cut-off relay 8 releases with the result that by the time the entry of the third digit on the wheel 104 has been compleed the clutch 104A will have released stopping this wheel unit. The shunting wheel 103D moves with the number wheel 103 and successively closes and opens the shunting contact 103E as the digits are entered on the wheel 103 with the result that the relays 3, 5, 27, 28, 29, 30, 31 and 32 successively release. During the entry of the fourth digit and subsequent to the release of relay 32 the cut-off relay 7 releases after which the clutch 103 releases. The wheel 103 continues movement after the wheel 104 has stopped since four digits are entered on this wheel whereas only three are entered on the wheel 104.

When the wheels 104 and 103 cease movement they register 34.

When cut-off relays 7 and 8 energized, contacts 7C and 8C closed grounding conductor 77C whereupon relay 77 was energized which resulted in closing contact 77A whereupon relay 78 was energized.

When the last of the cut-off relays for the counting relays deenergizes, in this instance relay 7, the contact as 7C opens and since contact 8C has previously opened conductor 77C is freed from ground whereupon slow-to-release relay 77 is deenergized and starts to release. When relay 77 releases contact 77A is opened and contact 77B is closed. Opening of contact 77A starts the release of slow-to-release relay 78. However at the time contact 77B closes relay 78 is still energized. Therefore ground is applied to magnet 56 from contact 77B through closed contacts 78A and 79B and conductor 80F. Subsequently slow-to-release relay 78 releases opening contact 78A freeing magnet 56 from ground which thereupon deenergizes. Energization of magnet 56 releases locked down keys 52 and 51 and upon release of this magnet the machine is ready for a second operation particularly since all relays will also be released.

*Adding 34 to 34.*—Wheels 104 and 103 now register 34 and since 34 is to be added to 34 keys 52 and 51 are again depressed and locked down and starting key 76 is again momentarily depressed and the above described operation is repeated. At the end of this second operation the wheels 104 and 103 register 68, the sum of 34 plus 34.

*Zero-setting operation.*—Since the desired addition has now been completed it is now desirable to return the number wheels to zero. Hence zero-setting key 81 is momentarily pressed which grounds conductor 81B whereupon zero-setting relay 108 is energized opening contact 108H but closing the other contacts of this relay. Opening of contact 108H prevents grounding of contacts 103E and 103G and like contacts of other number wheel units so that these contacts will not effect operations during a zero-setting operation even if they are closed during such an operation.

Relay 108 locks up through winding 108B, contacts 108C and 108F. If wheel 103, for example, is off zero position circuit will be closed through contact 103C whereby clutch 103A is grounded and energized which sets the wheel unit including number wheel 103 in motion. This same condition prevails for the other wheel units which are off zero position and hence clutch 104A will be energized and the wheel unit including the number wheel 104 will be set in motion. Inasmuch as the wheel unit including the number wheel 105 is in zero position the zero-setting contact thereof will be open and therefore clutch 105A will not be energized. Battery is supplied to the clutches 103A and 104A through conductor 106B, contact 106A and contact 107B. When the wheels 103 and 104 attain zero position the riders of contacts 103C and 104C enter the notches in wheels 103B and 104B, respectively, whereupon these contacts open and when the contact for a particular wheel unit opens the clutch of this wheel unit is deenergized whereupon the wheel stops. Thus when both the contacts 103C and 104C open the wheel units including the number wheels 103 and 104 stand at zero along with the wheel unit including the number wheel 105. When the last of the zero-setting contacts as 103C opens contacts 108F and 108C are freed from battery whereupon winding 108B of relay 108 is deenergized and relay 108 releases.

*Carry-over in addition.*—I have explained how 68 is entered in the amount manifesting device as the result of adding 34 to 34. If, after 68 has been entered on the wheels 103 and 104, 34 is to be added to this amount the resulting sum will be 102. In this operation a carry from the units order into the tens and a carry from the tens order into the hundreds order are required.

Assuming therefore that 68 appears on the number wheels 104 and 103 and that the keys 52 and 51 are again depressed and locked down and that the starting key 76 is again momentarily depressed, the counting relays will again effect entry of 34 on the number wheels 104 and 103, that is to say, four additional digits will be entered on the units wheel 103 and three additional units will be entered on the wheel 104 for the tens. Thus at the end of this entry from the counting relays the wheels 104 and 103 will respectively register 9 and 2. 92, however, is not the sum of 68 plus 34.

In this operation the number wheel 103 passed from 9 to 0 in moving from 8 to 2. As the number wheel passed from 9 to 0 the lobe 103J on carry-over contact-closing wheel 103F closed carry-over contact 103G whereupon relays 109 and 110 were energized which energized relays 151 and 153 and hence a carry was entered in the carry-over relays.

When the cut-off relay 7 deenergizes, which is the last of the cut-off relays for the counting relays to energize, contact 7D is closed. Contact 8D and contact 37 were already closed. Therefore this closing of contact 7D grounds conductor 25 inasmuch as relay 26 is not energized and contact 26A thereof is closed. Energization of relays 151 and 153 energized relay 158. Therefore conductor 25 is connected to contact 158B and hence when conductor 25 grounded, stepping relay 155 and clutch 121A are energized. Energization of clutch 121 sets the wheel unit including the number wheel 104 in motion.

The energization of relay 155 released relay 151. In the movement of wheel 104 under control of clutch 121A shunting wheel 121 closes contact 121E whereupon, as previously described, relay 153 is released and subsequently contact 121E opens, releasing relay 158 and opening contact 158B whereupon clutch 121A is deenergized. This occurs at the time the wheel 104 registers zero which results from entering 1 on the tens wheel, which already registered 9, under control of the carry-over relays.

Since wheel 104 now registers zero it passed from 9 to 0 in this carry-over operation. This resulted in the closing of contact 104G and the energization of relays 152 and 154 and also in the energization of cut-off relay 159. Hence when relay 158 deenergized in the preceding carry operation conductor 25 was connected to contact 158C. Contact 159B will be closed by reason of the energization of relay 159. Therefore stepping relay 156 and clutch 124A will be energized and digit 1 will be entered on the number wheel 105. When the entry of the digit 1 on the number wheel 105 is completed, clutch 124A will be released and prior to this relay 159 will have released.

The wheels 105, 104 and 103 will now register 102, the sum of 68 plus 34.

Multiplication

As an example the multiplying of 68 times 13 is described herein but it is to be understood that this is merely exemplary of multiplications that may be performed in the machine.

*Preparation for multiplication.*—As the first step in the multiplication of 68 times 13 multiplicand keys 57 and 58, the 6 and 8 keys in the tens and units orders, respectively, are pressed and locked down and thereby circuits are prepared but not closed to the counting or multiplicand relays 11 and 12 for 6 and 8 in the tens and units orders, respectively, of the counting or multiplicand relays.

Keys 83 and 84 for 1 and 3, respectively, in the tens and units orders of the multiplier keys are momentarily pressed. Pressing of key 83 closes contact 83A grounding conductor 83B (Fig. 2), 83B (Fig. 3), which energizes relay 13 through its right hand winding. Energization of relay 13 closes the left hand contact thereof whereby relay 13 is locked up under control of contact 15A through conductor 86B and normally closed contact 86A.

Energization of relay 13 also closes the right hand contact thereof whereupon its mate, relay 17, is energized through the left hand winding thereof which closes contact 17B thereof to prepare, but not close, a circuit to control relay 15.

Energization of relay 17 also closes the right hand contact thereof whereby a circuit is prepared through the right hand winding to contact 15B, which contact is grounded through conductor 86B and contact 86A.

Pressing of key 84 closes contact 84A grounding conductor 84B whereby relay 14 is energized through its right hand winding. Energization of relay 14 closes the left hand contact thereof whereby a stick or holding circuit under control of contact 16A is closed through conductor 86B and contact 86A.

Energization of relay 14 also closes the right hand contact thereof whereby its mate, relay 21, is energized and upon energization of this relay a circuit is prepared to contact 16B through the right hand contact of this relay. Energization of relay 21 also closes the left hand contact thereof whereby relay 22 is energized through its right hand winding. This closes a stick or holding circuit under control of contact 16A through the left hand winding of relay 22 and the mate of 22, relay 23, is energized as was relay 21 by the energization of relay 14. In like manner energization of relays 24 and 18 is effected.

Energization of relay 18 closes contact 18B and opens contact 18C whereby circuit to contact 17B is opened and a circuit is prepared, but not closed, to relay 16.

Inasmuch as both the relays 13 and 14 immediately lock up through stick or holding circuits it is only necessary to momentarily depress the multiplier keys as 83 and 84.

*Error correction.*—If one or more of the multiplier keys is incorrectly depressed so that a wrong multiplier is set up, error key 86 is pressed whereby contact 86A is opened. This frees contacts as 15A and 16A from ground whereupon relays as 13 and 14 are freed from ground which thereupon deenergize and release their mates and all relays of lower numerical value in the chain. When all such relays have been released key 86 is released whereupon contact 86A recloses and then the correct multiplier keys may be momentarily depressed to lock up the correct multiplier.

*First step in multiplication.*—Assuming that relays 13 and 14 and their associated relays have been locked up in the manner previously described and that multiplicand keys have been pressed and locked down whereby their associated contacts have been closed and circuits have been prepared to counting relays as 11 and 12, starting key 76 is momentarily depressed whereby conductor 76A is momentarily grounded. This grounds the contacts associated with the locked down multiplicand keys 57 and 58 whereupon multiplicand relays 11 and 12 are energized which, in the manner previously described, energizes their mates and all multiplicand relays in the same chain of lower numerical value.

The cut-off relays 8 and 7 will be energized in the manner previously described upon energization of the tens and units orders multiplicand or counting relays whereby contacts 8B and 7B are closed to engage clutches 104A and 103A, setting the number wheel units including the number wheels 104 and 103 in motion with shaft 132. These wheel units continue movement under control of counting relays, in the manner previously described, until wheel 104 registers 6 and wheel 103 registers 8. During the entry of 6 on the tens number wheel 104, cut-off relay 8 releases as described. Subsequently during the entry of 8 on the number wheel 103, cut-off relay 7 releases. Release of cut-off relay 8 opens contact 8C and release of cut-off relay 7 opens contact 7C.

The energization of relay 17 upon energization of the multiplier relays, as above described, closed contact 17X whereby conductor 79C was grounded and relay 79 thereupon energized closing contact 79A and opening contact 79B to prevent grounding of release magnet 56 until the last round of multiplication. Contact 79A is closed upon energization of relay 79 and connects contact 77B with grounding conductor 76A.

In example of multiplication described herein the multiplier keys for the digits 1 and 3, in the tens and units orders, respectively, are pressed energizing in the tens order but one pair of relays (13 and 17) and three pair in the units order beginning with relays 14 and 21. In this and all other like operations it is the relay pair representing the lowest digital value that energizes first and which is effective, by means of contacts 17X, in energizing relay 79. In the present instance relay 18 energizes and closes contact 18X after the energization of relay 17. This, however, is without effect in bringing about initial energization of relay 79 as this will have already been effected by the closing of contact 17X.

It will thus be seen that whenever any of the multiplier relays are energized relay 79 is energized and contact 79B is opened and contact 79A is closed.

Furthermore, contacts 8C and 7C closed upon energization of the cut-off relays 8 and 7 when their associated multiplicand relays energized with the effect of grounding conductor 77C whereby relays 77 and 78 were energized, as previously described. Closing of contacts 8C and 7C also grounded conductors 19 and 18F whereby ground was applied to relay 16 which thereupon energized making contact 16B before breaking contact 16A. Breaking of contacts 16A released relay 14 but relay 21 was held energized through contact 16B.

When, however, contacts 8C and 7C both have opened as above described conductors 77C, 19 and 18F are freed from ground. This deenergizes relay 16 making contact 16A before breaking contact 16B and relay 22 is held energized but relay 21 is released. Inasmuch as relay 77 is a slow-to-release relay it releases subsequent to the release of relay 16. Thus by the time contact 77B is closed relay 21 will be released and relay 22 will be held energized through contact 16A. Closing of contact 77B upon release of relay 77 grounds conductor 76A whereupon counting relays 11 and 12 and their mates and relays of lower digital value in the respective groups are reenergized. Subsequent to the energization of relays 11 and 12 slow-to-release relay 78 releases, opening contact 78A whereby ground is removed from grounding conductor 76A.

When the counting relays finish their energization and cut-off relays 8 and 7 reenergize, contacts 8C and 7C are closed whereupon conductors 77C, 19 and 18F are again grounded. This reenergizes relays 77 and 78 and relay 16. Energization of relay 16 frees relay 22 but holds relay 23 energized.

*Entry of carry-over in multiplication.*—Inasmuch as the counting relays are now again in operation the second entry of 68 onto the wheels 104 and 103 will be effected and when this second entry of 68 is completed the wheels 104 and 103 will respectively register 2 and 6. In passing from 8 to 6 in this operation the number wheel 103 passes from 9 to 0 whereupon the lobe 103J on wheel 103F closes contact 103G whereby relays 109 and 110 are energized and relays 151 and 153 are energized and locked up. In passing from 6 to 2 number wheel 104 passes from 9 to 0 whereby the lobe on wheel 104F closes contact 104G and relays 133 and 134 are energized with the result that relays 152 and 154 are energized and locked up. Hence a carry from the units order to the tens order and another carry from the tens order to the hundreds order are entered or accumulated in the carry over relays.

Each time relays as 15 and 16 energize contacts as 15D and 16D close whereby ground is applied to slow-to-release relay 26 which thereupon energizes and opens contact 26A. Release of cut-off relays 8 and 7 near the end of the second entry of 68 closes contacts 8D and 7D and contact 37 was already closed. This, however, does not have the effect of grounding conductor 25 inasmuch as contact 26A is open. Contact 26A is open due to the timing of relay 26, which is timed to continue energized between successive energizations of the multiplicand relays and to release after completion of the last round of multiplication.

Near the end of the entry of 2 and 6 on the wheels 104 and 103 cut-off relays 8 and 7 released whereby contacts 8C and 7C opened freeing conductors 77C, 19 and 18F from ground releasing relay 77 with the above described effect of re-grounding of conductor 76A and also deenergizing relay 16 whereby relay 23 released but relay 24 remained energized.

*Last round of multiplication under control of units order multiplier relays.*—Cut-off relays 8 and 7 reenergize as a result of the re-grounding of grounding conductor 76A which has the effect of reenergizing counting relays 11 and 12. Relay 24 is released but relay 18 remains energized under control of contact 16B by reason of the fact that relay 16 energized upon closing of contacts 8C and 7C.

The number wheels 104 and 103 are now in operation and subsequent to the release of the cut-off relays 8 and 7 in this operation the wheels will register 8 and 4 respectively. In this operation number wheel 103 in passing from 6 to 4 passed from 9 to 0 whereupon the lobe 103J on wheel 103F closed contact 103G with the effect of energizing relays 109 and 110 whereby relays 157 and 160 were locked up and a second carry was accumulated in the carry-over relays.

Upon deenergization of relays 8 and 7 contacts 8C and 7C open whereupon conductors 77C, 19 and 18F are freed from ground. This deenergizes relay 16 whereby contact 16B opens and relay 18 is released. This release of relay 18 opens contact 18B and closes contact 18C whereby conductor 18F is disconnected from relay 16 and is connected through contact 18C with conductor 17F which through closed contact 17B is connected with relay 15 to prepare it for energization upon the next closing of contacts 8C and 7C.

*Order shift in multiplication.*—Upon deenergization of relay 18 contact 18D closed grounding conductor 18E and contact 111 and through wiper 112 and conductor 112A relay 107 is thereby grounded. Battery is subsequently supplied to relay 107 through conductor 107D from contact 15C upon the energization of relay 15 at the start of the next operation which is under control of locked up relays 13 and 17 in the tens order on multiplier relays.

Subsequent to the release of relay 16 relay 77 released closing contact 77B to ground conductor 76A and effect energization of counting relays 11 and 12 as well as cut-off relays 7 and 8. Energization of cut-off relays 7 and 8 closes contacts 7C and 8C whereby conductors 77C, 19, 18F and 17F are grounded with the result that relay 15 is energized. Contacts as 17C always close before contacts as 7B and therefore relays as 15 are energized before the stepping relays associated with the counting or multiplicand relays are energized. The energization of relay 15 which results from the aforesaid closing of contacts 7C and 8C opens contact 15A after contact 15B has been closed. Hence relay 13 releases but relay 17 is held energized.

The energization of relay 15 closes contact 15C whereupon relay 107 energizes and this occurs before the energization of stepping relays as 9 by the closing of contacts as 7B. Energization of relay 107 opens contact 107B whereby conductor 106B is disconnected from battery and this prevents energization of stepping relays as 9 and parts in circuit therewith as explained more fully hereinafter.

Energization of relay 107 closes contact 107A whereby clutch 113 is grounded and engaged and shaft 114 is set in motion and this moves wiper 112 from engagement with grounded contact 111 into engagement with contact 111A. Contact 111A however is not grounded since contact 17D is open. Thus when wiper 112 disengages contact 111 relay 107 is freed from ground and it thereupon deenergizes and recloses contact 107B.

The opening of contact 107B and the resulting disconnection of conductor 106B from battery prevents energization of stepping relays 10 and 9 and the clutches 104A and 103A when contacts 8C and 7C of cut-off relays 8 and 7 close. These relays and clutches, however, are not reenergized immediately by the reclosing of contact 107B upon deenergization of relay 107 because slow-to-release relay 106 is energized whereby contact 106A is opened, this relay energizing and opening this contact upon movement of shaft 114 from position to the next in order shift in multiplication.

The relay 106 is energized through contact 114A which includes a rider engaged with the toothed disc 114C on shaft 114. As soon as shaft 114 starts to move in an order shift operation the rider on contact 114A rides up on a tooth on the disc 114C whereby ground is applied to relay 106 which thereupon energizes. When movement of shaft 114 ceases the rider on contact 114 is off a tooth on disc 114C and contact 114 therefore is open and relay 106 is deenergized. Relay 106 being a slow-to-release relay however does not immediately release and in fact does not until the order switching operation is completed. Hence stepping relays 10 and 9 and clutches 104A and 103A are not reenergized for the next operation until slow-to-release relay 106 releases and at this time the order shift operation is completed.

Upon movement of the shaft 114 whereby wiper 112 moves from engagement with contact 111 into engagement with contact 111A the units order shifting wiper 115 advances one step from engagement with the contact 101 into engagement with contact 118. The tens order shifting wiper 116 also moves from engagement with contact 102 into engagement with contact 119 and the hundreds order shifting wiper 117 advances in like manner.

*Multiplication in tens order.*—As the result of the above described order shifting operation and the advance of wipers 115 and 116 stepping relay 9 is in circuit with clutch 104A and stepping relay 10 is in circuit with clutch 105A. Clutch 103A is out of circuit inasmuch as the units order number wheel is not to be operated because operation is now under control of the tens order multiplier relays. At the start of this next operation the wheels 104 and 103 respectively register 8 and 4.

When battery is supplied to conductor 106B by the closing of contact 106A clutches 104A and 105A and stepping relays 9 and 10 energize whereupon, under control of the multiplicand relays, 6 and 8 are respectively added on the number wheels 105 and 104 and at the end of this operation the wheels 105, 104 and 103 register 6, 4, respectively.

In this operation number wheel 104 passes from 8 to 6 and hence passes from 9 to 0 which results in the closing of contact 104G and the energization of relay 161 and its mate 165.

While the last digit 6 is being entered on the number wheel 105 cut-off relay 8 deenergizes and subsequently while the last digit 6 is being entered on the wheel 104 cut-off relay 7 deenergizes. Upon deenergization of cut-off relay 7 and the opening of contact 7C, conductors 77C, 19, 18F and 17F are freed from ground. This deenergizes relay 15 which opens contact 15B whereupon relay 17 deenergizes. Deenergization of relay 17 opens contact 17X whereupon relay 79 deenergizes opening contact 79A and closing contact 79B. Hence when slow-to-release relay 77 subsequently releases and contact 77B closes, circuit is closed through contacts 78A and 79B and conductor 80F to release magnet 56 whereupon locked down keys 57 and 58 are released.

At this time all counting relays and their cut-off relays and all multiplier relays and their control relays are released.

*Carry-over operation multiplication.*—Since the cut-off relays 7 and 8 are released contacts 7D and 8D are closed. Moreover the control relays 15 and 16 are released and circuit to slow-to-release relay 26 is opened and this relay starts to release. Slow-to-release relay 26 prevents grounding of conductor 25 intermediate rounds of multiplication and during order shift operations by maintaining contact 26A open. Hence the release time of this relay is sufficiently prolonged to prevent opening of contact 26A to enable nine pairs of multiplicand relays to become energized as well as the cut-off relay as 7 associated therewith and a control relay as 16 and also to allow for its own energizing time. When, however, relay 26 does release contact 26A closes and conductor 25 is grounded through closed contacts 37, 8D, 7D and 26A.

In the present instance cut-off relay 158 is energized since carry-over relays in the lower group are energized wherefore contact 158B is closed and contact 158C is open. Therefore conductor 25 is connected through contact 158B with stepping relay 155 and clutch 121A. Thus grounding of conductor 25 energizes stepping relay 155 and clutch 121A whereupon wheel 104 takes motion.

The energization of relay 155 releases relay 157. Shortly after wheel 104, and therefore shunting wheel 121, takes motion, contact 121E shunts out stepping relay 155 whereupon relay 160 releases. Shunting wheel 121 continues to move and just prior to the entry of the first carry on the wheel 104, that is to say, immediately before this wheel registers 7, shunting contact 121E opens to energize relay 155 and thereby release relay 151.

Wheels 104 and 121 continue movement and shortly after the beginning of the entry of the second carry, that is, shortly after the beginning of the registration of 8 on the wheel 104, shunting contact 121E closes deenergizing relay 155 to release relay 153 and shortly before the registration of 8 is completed contact 121E opens energizing relay 155 to release cut-off relay 158 whereupon contact 158B opens and stepping relay 155 and clutch 121A are freed from ground and the clutch releases at the time the wheel 104 registers 8.

Immediately after contact 158B opened contact 158C closed and since cut-off relay 159 is energized, contact 159B is closed wherefore conductor 25 grounds stepping relay 156 and clutch 124A whereupon number wheel 105 and shunting wheel 104 take motion. This, in the manner above described in connection with the relays 157, 160, 151, 153 and 158, effects successive release of relays 161, 165, 152, 154 and 159 and immediately subsequent to the release of relay 159 clutch 124A will release and the wheel 105 will register 8.

Wheels 105, 104 and 103 now register 884, the product of 68 times 13.

*Zero-setting operation.*—Since the multiplying computation has been completed it is desirable to reset the number wheels to zero and this is effected by momentarily closing zero-setting key 81 whereupon all of the number wheels take motion under control of their zero-setting contacts and return to zero in the manner previously described.

Inasmuch as the switch 130 has been shifted from its normal units order position contact 128 is closed. Hence upon energization of the relay 108 by pressing of the key 81 ground is applied through closed contact 108G, conductor 128A, closed contact 128 to the clutch 113 whereupon the shaft 114 is set in motion and this continues to rotate until the rider of contact 128 enters the notch in disc 114B fast on the shaft 114 whereupon contact 128 opens and clutch 113 is released. Since the notch in the disc 114B is at the normal units order position of switch 130 it will now have been returned to its normal units order position and since the number wheels 105, 104 and 103 will be in their zero positions the machine is ready for its next operation.

*Subtraction.*—The minuend is entered in the amount manifesting device in the same manner as that in which 34 is entered therein, which has been described heretofore. The subtrahend is then set up on the keys of Fig. 1 and the direction of rotation of shafts 132 and 127 is reversed. This can be done conveniently by reversing the motor 129. The subtrahend is then entered in the amount manifesting device under control of the counting relays, as described above, and since, in this operation, the amount manifesting device moves in a direction opposite to that in which it moved when the minuend was entered therein and the device theerfore, after entry of the subtrahend, registers the difference. Any carry-over required is accumulated in the manner above described and is entered in the manner above described prior to the time the shafts 132 and 127 are again rotated in their normal direction of rotation.

SUMMARY

In multiplying and adding operations a carry from one order of digits into the next higher order is necessary each time an amount manifesting member, for a particular order of digits, in an amount manifesting device passes from 9 to 0 and likewise, in a subtracting operation, when such a member passes from 0 to 9. The present invention includes means which are actuated each time such movement of an amount manifesting member occurs and in the illustrated form of the invention this consists of contacts, as 103G, which are engaged by means as wheel 103F and lobe 103J thereon, associated with the member, these contacts closing an electrical circuit.

I have found it to be advantageous to effect entry of a carry or carries from one order of digits in the next higher order of digits as the last step of a computation in which the carry or carries arise. Thus in an adding or subtracting computation the carry is effected after one number has been added to or subtracted from another, as the case may be, but in multiplying computations effected by the over and over addition method the carries are not effected until the multiplicand has been entered as many times as required by the multiplier and this entails accumulating and storing the carries. Thus I have provided means in association with each order of digits to accumulate the carries arising in that order of digits and I have so connected each of these means with the next higher order of digits that the accumulated carries may be entered in the next higher order at a predetermined time. The accumulation of the carries is effected under control of the means actuated by the means associated with the amount manifesting member of the amount manifesting device. In the illustrated form of the invention such accumulating and storing means are relays, as 151 and 153, under control of the circuit including the contacts that are closed each time a carry is to be made. Closing of the contacts effects energization and locking up of the relays sequentially in a number corresponding to the number of the carries required.

The entry of the carries in the order of digits next higher to that in which they arise is effected as the last step of the computation and this is under control means which effect starting of the entry of the carries when other steps are completed. Such means in the illustrated form of the invention are contacts, as 7D, 8D, 37 and 26A, in circuit with means as control relays, as 155, and entry effecting means such as clutches, as 121A.

Hence, while I have illustrated and described a preferred form of apparatus and examples of computations that may be performed thereby and while in so doing I have shown and described counting relays for controlling the entry of numbers in the amount manifesting device and have also shown and described a particular form of amount manifesting device as well as many other details of construction, it is to be understood that my novel carry-over may be used with other forms of apparatus embodying a variety of devices and that the illustrated apparatus and devices are capable of variation and modification. I am, therefore, not to be limited to the precise details set forth but desire to avail myself of such changes and alterations as fall within the scope of the following claims.

I claim:

1. In a calculating machine wherein computations are performed in a plurality of orders of digits, means for accumulating the carries from one order into the next order required in a computation, said means including a plurality of members settable in sets of which each set is representative of a single carry, means for successively entering accumulated carries in said next order as the last steps of the computations in which the carries are accumulated, and means controlled by said entering means for restoring said settable members to their unset condition during entry of the accumulated carries.

2. In a calculating machine wherein computations are performed in a plurality of orders of digits, means for accumulating the carries from each order into the next order required in a computation, means for progressively entering accumulated carries into said next orders order by order, and means controlled by the carry accumulating means for preventing the entry of accumulated carries in a higher order until the entry of accumulated carries in a lower order has been completed and providing for such entry in said higher order immediately upon completion of entries in said lower order.

3. In a calculating machine including a register wherein the result of a computation is accumulated in a plurality of digital orders, accumulating means under control of said register for accumulating the carries from one order to the next order required in a computation, means under control of the accumulating means for entering accumulated carries in the register, and means controlled by the carry accumulating means for preventing the entry of an accumulated carry in a higher order until the entry of accumulated carries in all preceding orders has been completed and providing for such entry in said higher order immediately upon completion of entries in any lower order.

4. In a calculating machine including a manifesting device, means for entering the result of a computation in said device, means including parts pertaining to respective orders of said manifesting device for accumulating any carries from any order to the respective next higher orders as required in a computation, means for entering any accumulated carries in said next higher orders, means for effecting operation of the accumulated carry entry means at a predetermined time in a computation, and means under control of said parts pertaining to any order so long as carries are stored therein for preventing operation of said accumulated carry entry means for the next higher order for rendering said last means effective to enable the carry entry means for entering carries in the next higher order when said stored carries are exhausted.

5. In a carry-over device for a calculating machine wherein computations may be performed in a plurality of orders, means for receiving a first carry from one order into the next order required in a computation, means for receiving a second carry from said one order into the next order, means for receiving a first carry from said next order into a succeeding order, means for receiving a second carry from said next order into said succeeding order, entering means for entering any carries from said one order into said next order, additional entering means for entering any carries from said next order into said succeeding order and means under control of the first two carry receiving means for disabling said additional entering means only so long as any carries are stored in said first two carrying receiving means.

6. In a carry-over device for a calculating machine wherein computations may be performed in a plurality of orders, means for receiving a first carry from one order into the next order required in a computation, means for receiving a second carry from said one order into the next order, means for receiving a first carry from said next order into a succeeding order, means for receiving a second carry from said next order into said succeeding order, entering means for entering any carries from said one order into said next order, additional entering means for entering any carries from said next order into said succeeding order, and means under control of the first two named carry receiving means for disabling said additional entering means so long as carries are stored in said first two carry receiving means thereby preventing entry of any carry from said next order into said succeeding order until the entry of any carry from said one order into said next order has been completed, and means under control of the third and fourth named carry receiving means and operable so long as carries are stored in said third and fourth carry receiving means to cause the means under control of the first two named carry receiving means to enable said additional entering means immediately upon exhaustion of carries in the first two carrying receiving means.'

7. In a carry-over device for a calculating machine wherein computations may be performed in a plurality of orders, means for receiving a first carry from one order into the next order required in a computation, means for receiving a second carry from said one order into the next order, means for receiving a first carry from said next order into a succeeding order, means for receiving a second carry from said next order into said succeeding order, entering means operable during one period when carries are stored in said carry receiving means for entry in both said next order and in said succeeding order for entering any carries from said one order into said next order and operable during a succeeding period for entering any carries from said next order into said succeeding order, and means under control of the first two named carry receiving means and operable in an instance when no carries are stored in said first two named carry receiving means but when carries are stored in said third and fourth named carry receiving means to disable said entry means so far as concerns entry of carries from said one order into said next order and to enable said entry means for effecting entry of the carries from said next order into said succeeding order during said one period.

8. In a carry-over device for calculating machines, a relay, a second relay, means for energizing the first relay when a carry from one order of digits to the next order is required in a calculation, means under control of the first relay for energizing the second relay after energization of the first relay, means independent of the first energizing means for maintaining said relays energized and operable to successively deenergize said relays, means for entering said carry in said next order, means controlled by said carry entering means for operating said maintaining means to effect such deenergization of said relays, and means controlled by said relays for enabling said carry entering means.

9. In a carry-over device for calculating machines, a relay, a second relay, means for energizing the first relay when a carry from one order of digits to the next order is required in a calculation, means under control of the first relay for energizing the second relay after energization of the first relay, a third relay, means for energizing said third relay under control of said second relay, means for maintaining said relays energized, means for interrupting said maintaining means, and means controlled by said first two relays upon deenergization thereof for entering said carry in said next order, said third relay deenergizing to prevent operation of the entering means after the entry of said carry.

10. In a carry-over device for calculating machines, a relay, a second relay, means for energizing the first relay when a carry from one order of digits to the next order is required in a calculation, means under control of the first relay for energizing the second relay after energization of the first relay, a third relay, means for energizing said third relay under control of said second relay, a fourth relay, means on the second relay for preparing said fourth relay for energization by the energizing means when a second carry from said one order into said next order is required in a calculation, a fifth relay, means under control of the fourth relay for energizing the fifth relay after energization of the fourth relay, means for maintaining said relays energized, means for interrupting said maintaining means, and means controlled by the release of the fourth and fifth of said relays for entering the second of said carries in said next order and controlled by the first and second of said relays for entering the first of said carries in said next order.

11. In a calculating machine wherein computations are performed in a plurality of orders of digits, electrically operated means including a plurality of successively energizable and deenergizable members, said members being energizable in a predetermined sequence to represent the carries required from one order to the next in a computation, means under control of the energized of said members for successively entering the accumulated carries in said next order as the last step of the computation in which carries are accumulated, and means controlled by said entering means for successively deenergizing said members during entry of the accumulated carries.

12. In a calculating machine wherein computations are preformed in a plurality of orders of digits, a plurality of relays successively energizable in a chain to store the carries required from one order to the next in a computation, holding circuits for maintaining said relays in energized condition, said holding circuits becomng effective upon energization of said relays and the number of said relays energized being determined by the number of carries so stored, means under control of the energized of said relays for successively entering the stored carries in said next order as the last step of the computation in which carries are stored, and means controlled by said entering means for successively breaking said holding circuits for said relays during entry of the stored carries to thereby successively deenergize said relays.

13. In a calculating machine including a register wherein the result of a computation is accumulated in a plurality of digital orders, means for effecting entry of such a result in said register, means for accumulating the carries required from one digital order into the next digital order in the course of entry in said register by the entry effecting means and including a plurality of members settable in sets of which each set is representative of a single carry, means controlled by the entry effecting means and operative to initiate successive entry of the accumulated carries in said next order as the last step in accumulating a result in said register, and means controlled by elements of said register for restoring said settable members to their unset condition during entry of the accumulated carries.

14. In a calculating machine including a register wherein the result of a computation is accumulated in a plurality of digital orders, means for effecting entry of such a result in said register, means for accumulating the carries required from one digital order into the next digital order in the course of entry in said register by the entry effecting means and including a plurality of members arranged in groups and settable in sets and in which each group pertains to carries from a particular order to the next order and of which each set is representative of a single carry, means controlled by the entry effecting means and operative to initiate entry of the accumulated carries into said next orders order by order as the last step in accumulating a result in said register, and means controlled by elements of said register for restoring said settable members to their unset condition during entry of the accumulated carries.

15. In a calculating machine including a register wherein the result of a computation is accumulated in a plurality of digital orders, means for effecting entry of such a result in said register, means for accumulating the carries required from one digital order into the next digital order in the course of entry in said register by the entry effecting means and including a plurality of members arranged in groups and settable in sets and in which each group pertains to carries from a particular order to the next order and of which each set is representative of a single carry, means controlled by the entry effecting means and operative to initiate entry of the accumulated carries into said next orders order by order as the last step in accumulating a result in said register, and means controlled by the carry accumulating means for preventing the entry of accumulated carries in a higher order until the entry of accumulated carries in a lower order has been completed.

16. In a calculating machine including a register wherein the result of a computation is accumulated in a plurality of digital orders, means for effecting entry of such a result in said register, electrically operable means for accumulating the carries required from one order of digits into the next order in the course of entry in said register by the entry effecting means and including a plurality of members successively energizable and deenergizable in sets of which each energized set is representative of a single carry, means in said register for energizing a successive one of said sets of members whenever a carry is required from one order of digits to the next order in the course of entry in said register by the entry effecting means, means for maintaining the energized of said members energized and operable to successively deenergize said sets of members, means controlled by said entry effecting means for initiating entry of the accumulated carries in said next order as the last step in accumulating a result in said register, and circuit-closing means in said register operable to effect operation of said maintaining means in the course of entry of accumulated carries to effect deenergization of said members.

17. In a calculating machine including a register wherein the result of a computation is accumulated in a plurality of digital orders, means for effecting entry of such a result in said register, a plurality of relays successively energizable in a chain for accumulating the carries from one order of digits to the next order in the course of entry in said register by entry effecting means, said relays being energizable in sets of which each set is representative of a single carry, means in said register for energizing one of said sets of relays whenever a carry is required from one order of digits to the next order, means for establishing holding circuits for said relays upon energization thereof, means controlled by elements of said register for successively breaking said holding circuits to effect successive deenergization of said relays during entry of the accumulated carries, and means under control of said entry effecting means for initiating entry of accumulated carries as the last step in accumulating a result in said register.

CLYDE SMITH.